(12) United States Patent
Robertsson

(10) Patent No.: US 8,396,668 B2
(45) Date of Patent: Mar. 12, 2013

(54) MARINE SEISMIC SURVEYING EMPLOYING INTERPOLATED MULTICOMPONENT STREAMER PRESSURE DATA

(75) Inventor: Johan Olof Anders Robertsson, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 596 days.

(21) Appl. No.: 11/568,803

(22) PCT Filed: May 13, 2005

(86) PCT No.: PCT/GB2005/001855
§ 371 (c)(1),
(2), (4) Date: Nov. 7, 2006

(87) PCT Pub. No.: WO2005/114258
PCT Pub. Date: Dec. 1, 2005

(65) Prior Publication Data
US 2007/0265785 A1 Nov. 15, 2007

(30) Foreign Application Priority Data
May 21, 2004 (GB) .................................. 0411305.6

(51) Int. Cl.
*G01V 1/00* (2006.01)
*G01V 1/38* (2006.01)
(52) U.S. Cl. ............................................. 702/17; 367/24
(58) Field of Classification Search .................. 702/17, 702/18, 1–2, 14, 81, 84, 127, 138, 141–143, 702/179, 182–183, 189–191, 193–195, 197; 367/20–22, 24, 14–15, 73, 87–89, 92, 97, 367/131, 140–141, 149, 153–154, 178; 703/2, 703/5, 9–10
See application file for complete search history.

(56) References Cited

U.S. PATENT DOCUMENTS

| | | | |
|---|---|---|---|
| 3,283,293 A | 11/1966 | Pavey, Jr. et al. ............ 367/172 |
| 4,437,175 A | 3/1984 | Berni | |
| 4,648,080 A * | 3/1987 | Hargreaves .................... 367/20 |
| 4,752,916 A * | 6/1988 | Loewenthal .................... 367/24 |
| 4,937,793 A * | 6/1990 | Shuck et al. .................... 367/24 |
| 4,953,139 A | 8/1990 | Laster et al. | |
| 4,992,990 A | 2/1991 | Langeland et al. ............ 367/19 |
| 5,309,360 A * | 5/1994 | Monk et al. .................... 702/17 |
| 6,026,057 A | 2/2000 | Byun et al. | |
| 6,081,765 A * | 6/2000 | Ziolkowski .................... 702/17 |

(Continued)

FOREIGN PATENT DOCUMENTS

| | | |
|---|---|---|
| EP | 0515188 | 11/1992 |
| EP | 0515188 B1 | 2/1998 |

(Continued)

OTHER PUBLICATIONS

Druzhinin, A., Anti-Aliased Kirchhoff-Helmholtz Transformations, 1999, Geophysical Prospecting, vol. 47, pp. 757-783.*

(Continued)

*Primary Examiner* — Toan Le

(57) ABSTRACT

It is described a method of interpolating and extrapolating seismic recordings, including the steps of deriving particle velocity related data from seismic recordings obtained by at least one streamer carrying a plurality of multi-component receivers and using the particle velocity related data to replace higher derivatives of pressure data in an expansion series.

19 Claims, 6 Drawing Sheets

U.S. PATENT DOCUMENTS

| | | |
|---|---|---|
| 6,292,755 B2 | 9/2001 | Chambers et al. |
| 6,295,505 B1 * | 9/2001 | Assa et al. .................. 702/17 |
| 6,438,069 B1 | 8/2002 | Ross et al. |
| 6,510,390 B1 | 1/2003 | Bunting et al. |
| 6,512,980 B1 | 1/2003 | Barr |
| 6,529,833 B2 | 3/2003 | Fanini et al. |
| 6,574,563 B1 | 6/2003 | Nickel |
| 6,640,190 B2 | 10/2003 | Nickel |
| 6,836,448 B2 * | 12/2004 | Robertsson et al. ........... 367/59 |
| 6,906,982 B2 | 6/2005 | Calvert |
| 6,977,867 B2 | 12/2005 | Chamberlain |
| 7,523,003 B2 | 4/2009 | Robertsson et al. |
| 2001/0005813 A1 | 6/2001 | Chambers et al. |
| 2002/0173917 A1 | 11/2002 | Nickel |
| 2003/0147306 A1 * | 8/2003 | Robertsson ................. 367/24 |
| 2004/0042341 A1 | 3/2004 | Tenghamn et al. ........... 367/15 |
| 2004/0067002 A1 | 4/2004 | Berg et al. |
| 2005/0149267 A1 | 7/2005 | van den Beukel et al. |
| 2005/0194201 A1 | 9/2005 | Tenghamn et al. |
| 2005/0195686 A1 | 9/2005 | Vaage et al. |
| 2006/0239117 A1 | 10/2006 | Singh et al. |
| 2006/0256653 A1 | 11/2006 | Toennessen et al. |
| 2006/0285435 A1 | 12/2006 | Robertsson |
| 2008/0008036 A1 | 1/2008 | Morley |
| 2001/1012881 | 6/2011 | Keers |

FOREIGN PATENT DOCUMENTS

| | | |
|---|---|---|
| GB | 2149503 A | 6/1985 |
| GB | 2256048 A | 11/1992 |
| GB | 2363459 A | 12/2001 |
| GB | 2410551 A1 | 8/2005 |
| GB | 2414299 A | 11/2005 |
| WO | WO 98/28636 | 7/1998 |
| WO | WO 00/20895 | 4/2000 |
| WO | 02073239 A1 | 9/2002 |
| WO | 02075363 A1 | 9/2002 |
| WO | WO 2004/036254 | 4/2004 |
| WO | WO 2005/073758 | 8/2005 |
| WO | 2005/114258 A | 12/2005 |
| WO | 2008005775 A2 | 1/2008 |

OTHER PUBLICATIONS

Ikelle et al., Kirchhoff Scattering Series: Insight into the Multiple Attenuation Method, Jan.-Feb. 2003, Geophysics, vol. 68, No. 1, pp. 16-28.*

Kraaijpoel, D., 2003, Seismic ray fields and ray field maps: theory and algorithms, Ph.D. thesis, Utrecht University.

EP Search Report, dated Sep. 17, 2008, for Application No. EP 06270096.8.

International Search Report and Written Opinion of PCT Application No. PCT/US2007/072365 dated Sep. 15, 2008: pp. 1-11.

Official Action of Russian Application No. 2007126480 dated Oct. 20, 2008: pp. 1-9.

Aronson et al., "Time Will Tell: New Insights from Time-Lapse Seismic Data," Oilfield Review, Summer 2004: pp. 6-15.

Eiken et al., "A proven method for acquiring highly repeatable towed streamer seismic data," Geophysics, Jul.-Aug. 2003, vol. 68(4): pp. 1303-1309.

Anonymous, "Offshore Shipping Online: GeoStreamer starts to make waves," Nov. 2007, retrieved Oct. 19, 2010: pp. 1-4, <http://www.oilpubs.com/oso/article/asp!v1=6959>.

Goff et al., "Interpolation of Fluvial Morphology Using Channel-Oriented Coordinate Transformation: A Case Study From the New Jersey Shelf," Mathematical Geology, Aug. 2004, vol. 36(6): pp. 643-658.

Hale, "Stable explicit depth extrapolation of seismic wavefields," Geophysics, Nov. 1991: pp. 1770-1777.

Martin et al., "Acquisition of marine point receiver seismic data with a towed streamer," SEG 2000 Expanded Abstracts, 2000: pp. 1-4.

Rickett et al., "A cross-equalization processing flow for off-the-shelf 4D seismic data," Society of Exploration Geophysicists, 1998 SEG Annual Meeting, Sep. 1998: pp. 1-4.

Robertsson et al., "Rough-sea deghosting using a single streamer and a pressure gradient approximation," Geophysics, Nov.-Dec. 2002, vol. 67(6): pp. 2005-2011.

Anonymous, "PGS deploys its first GeoStreamer 3D vessel with eBird active positioning control system," Navigation News Subsea News, Oct. 2010: p. 1, <http://www.km.kongsberg.com/ks/web/nokbg0238.nsf/AllWeb/F85C9>.

* cited by examiner

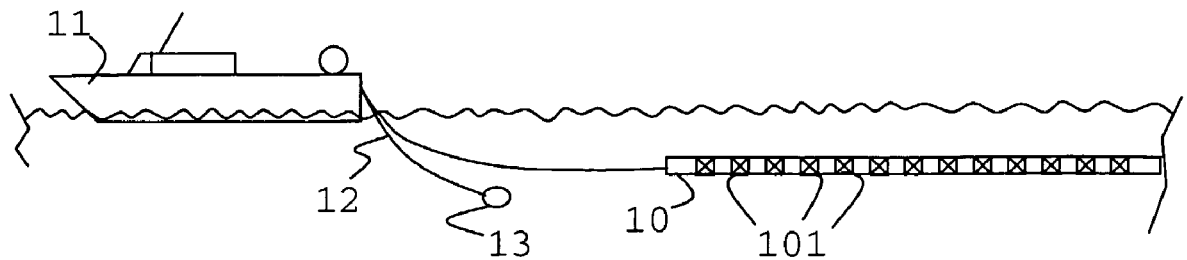

FIG. 1B(prior art)

```
┌─────────────────────────────────────────┐
│ Obtain multi-component marine seismic   │
│ data using one or more streamers towed  │
│ through a body of water                 │
└─────────────────────────────────────────┘
  21 ↓
┌─────────────────────────────────────────┐
│ In a Taylor expansion replace first     │
│ order and/or second order derivatives   │
│ of cross-line terms with derivatives of │
│ in-line data or use Hermite polynomials │
└─────────────────────────────────────────┘
  22 ↓
┌─────────────────────────────────────────┐
│ Inter/Extra-polate such data into       │
│ regions where no data was measured      │
└─────────────────────────────────────────┘
  23
```

FIG. 2

MARINE SEISMIC SURVEYING EMPLOYING INTERPOLATED MULTICOMPONENT STREAMER PRESSURE DATA

The present invention generally relates to methods of interpolating and extrapolating seismic recordings. It particularly relates to such methods, where the seismic recordings are obtained using one or more multi-component towed marine receiver cables or streamers.

BACKGROUND OF THE INVENTION

In the field of seismic exploration, the earth interior is explored by emitting low-frequency, generally from 0 Hz to 200 Hz, acoustic waves generated by seismic sources. Refractions or reflections of the emitted waves by features in subsurface are recorded by seismic receivers. The receiver recordings are digitized for processing. The processing of the digitized seismic data is an evolved technology including various sub-processes such as noise removal and corrections to determine the location and geometry of the features which perturbed the emitted wave to cause reflection or refraction. The result of the processing is an acoustic map of the earth interior, which in turn can be exploited to identify for example hydrocarbon reservoirs or monitor changes in such reservoirs.

Seismic surveys are performed on land, in transition zones and in a marine environment. In the marine environment, surveys include sources and receiver cables (streamers) towed in the body of water and ocean bottom surveys in which at least one of sources or receivers are located at the seafloor. Seismic sources and/or receivers can also be placed into boreholes.

The known seismic sources include impulse sources, such as explosives and airguns, and vibratory sources which emit waves with a more controllable amplitude and frequency spectrum. The existing receivers fall broadly speaking into two categories termed "geophones" and "hydrophones", respectively. Hydrophones record pressure changes, whereas geophones are responsive to particle velocity or acceleration. Geophones can recorded waves in up to three spatial directions and are accordingly referred to as 1C, 2C or 3C sensors. A 4C seismic sensor would be a combination of a 3C geophone with a hydrophone. Both types of receivers can be deployed as cables with the cable providing a structure for mounting receivers and signal transmission to a base station. Such cables fall into two distinct categories: one being so-called ocean-bottom cables which maintain contact with the sea-floor, while the second category is known as streamers which are towed through the water without touching the sea-floor.

Presently, the seismic industry is in the process of developing multi-component cables or streamers. Multi-component streamers include a plurality of receivers that enable the detection of pressure and particle velocity or time derivatives thereof. In so-called dual sensor towed streamers, the streamer carries a combination of pressure sensors and velocity sensors. The pressure sensor is typically a hydrophone, and the motion or velocity sensors are geophones or accelerometers. In the U.S. Pat. No. 6,512,980 a streamer is described carrying pairs of pressure sensors and motion sensors combined with a third sensor, a noise reference sensor. The noise reference sensor is described as a variant of the prior art pressure sensor.

In the United Kingdom patent application GB 0402012.9, there is proposed a streamer having a plurality of compact clusters of hydrophones. The streamer is adapted to provide gradient measurements of pressure, which in turn can be readily transformed into particle velocity data.

The main motivation for developing multi-component streamers has been to decompose the recorded data into its up- and down-going components, i.e., to free the data of "ghosts" caused by reflection at the sea surface. In this memo we introduce a new application area for multi-component streamers.

On the other hand, the seismic industry has since long experienced the need to interpolate or extrapolate trace recordings into areas void of receivers. Normally the wavefield and/or its derivatives are only known at a number of discrete locations. However, in practice it is often desirable to extend the knowledge of the wavefield to other points using interpolation, extrapolation or a combination of extrapolation and interpolation, sometimes known as intrapolation. Such techniques are applied, for example, to determine pressure data along the streamer, away from a streamer, at near-source offsets, or between two adjacent streamers.

In the light of the above prior art, it is seen as an object of the present invention to provide improved methods of interpolating and extrapolating seismic recordings.

SUMMARY OF THE INVENTION

In an aspect of the invention the measured data from a multi-component streamer are used to derive a filter which interpolates or extrapolates pressure data away from the location of the streamer.

The filter is preferably based on an expansion series of the pressure data.

An expansion series is generally defined as a representation of a function or data set by means of a sum of increasing higher derivatives of the function or data set at a point or the space surrounding a point. One of the most used expansion series is the Taylor series. Whereas Taylor series are generally not suitable for extrapolating oscillatory functions over great distances, the invention is based on the realization that in seismic applications the waves arrive at the receivers with near vertical incidence.

For certain applications, in particular for intrapolation between known points of the data set, it is a preferred variant of the present invention to use a Taylor series with modified weighting, more preferably weighting known as barycentric or triangular weighting.

Though expansion series have been proposed in seismic theory, they were severely restricted in real application because such expansions leads to cross-line terms which are difficult to evaluate. Lack of accurate particle velocity caused further problems: Without such data, the errors made by intra- and extrapolation render the results unreliable. It has now been found that multi-component streamers are capable of providing sufficiently accurate particle velocity related data either directly or indirectly.

In a preferred embodiment or the invention, first-order cross-line derivatives of data in the filter or expansion series are substituted by in-line derivatives. In a more preferred embodiment of the invention, first-order and second-order cross-line derivatives of data in the filter or expansion series are substituted by in-line derivatives.

In a preferred embodiment the expansion series is accurate to a first-order, more preferably to the second-order expansion term. Clearly, it is desirable to extend the series into the highest order permitted by the available computing power. However, the terms involve more and more complex derivatives of the measured data. Hence, such an extension is preferably limited to the term which can be replaced or expressed in terms of accurately measured data.

In a preferred embodiment functions, preferably linear functions of particle velocity related data and in-line pressure data are used to replace higher cross-line derivatives of pressure data in the expansion series.

Herein, the terms "in-line" and "cross-line" are used in their conventional meaning in the seismic industry, hence, as the direction along the main streamer axis and the direction perpendicular to it, respectively. The derivatives used are preferably spatial derivatives and more preferable spatial derivatives in in-line direction.

The methods described herein can be used for many applications, including but not limited to extrapolating into a direction away from a streamer, intrapolating into a space between two streamers, even in case that one of the streamers is not a multi-component streamer, intrapolating into a direction along a streamer, or intrapolating into a space closer to a seismic source.

It is advantageous to be capable of intrapolating into a direction along a streamer to maximize or otherwise optimize receiver spacing in the streamer.

Interpolation of marine seismic recordings is fundamental to processing of 3D seismic data. Applications include imaging and multiple elimination (short source-receiver offsets, cross-line receiver locations, etc.). The present invention can allow for better 3D solutions to, for instance, imaging and multiple removal problems as well as significantly increasing efficiency of marine seismic operations.

In addition, time-lapse in an important application area where interpolation/extrapolation of actual receiver locations to those in the legacy data can be critical to isolate the time-lapse response from noise introduced by deviations from the ideal time-lapse survey.

The methods of the present invention can also be beneficial in multiple elimination and imaging as well as in time-lapse applications or other application where a regularization of data location has an advantage.

The methods of this invention can also be used to interpolate/extrapolate into vertical (z) direction.

These and other aspects of the invention will be apparent from the following detailed description of non-limitative examples and drawings.

BRIEF DESCRIPTION OF THE DRAWINGS

FIGS. 1A and 1B illustrate a typical marine seismic survey with towed streamers;

FIG. 2 is a diagram illustrating steps in accordance with an example of the invention;

DETAILED DESCRIPTION

Figure 1A:
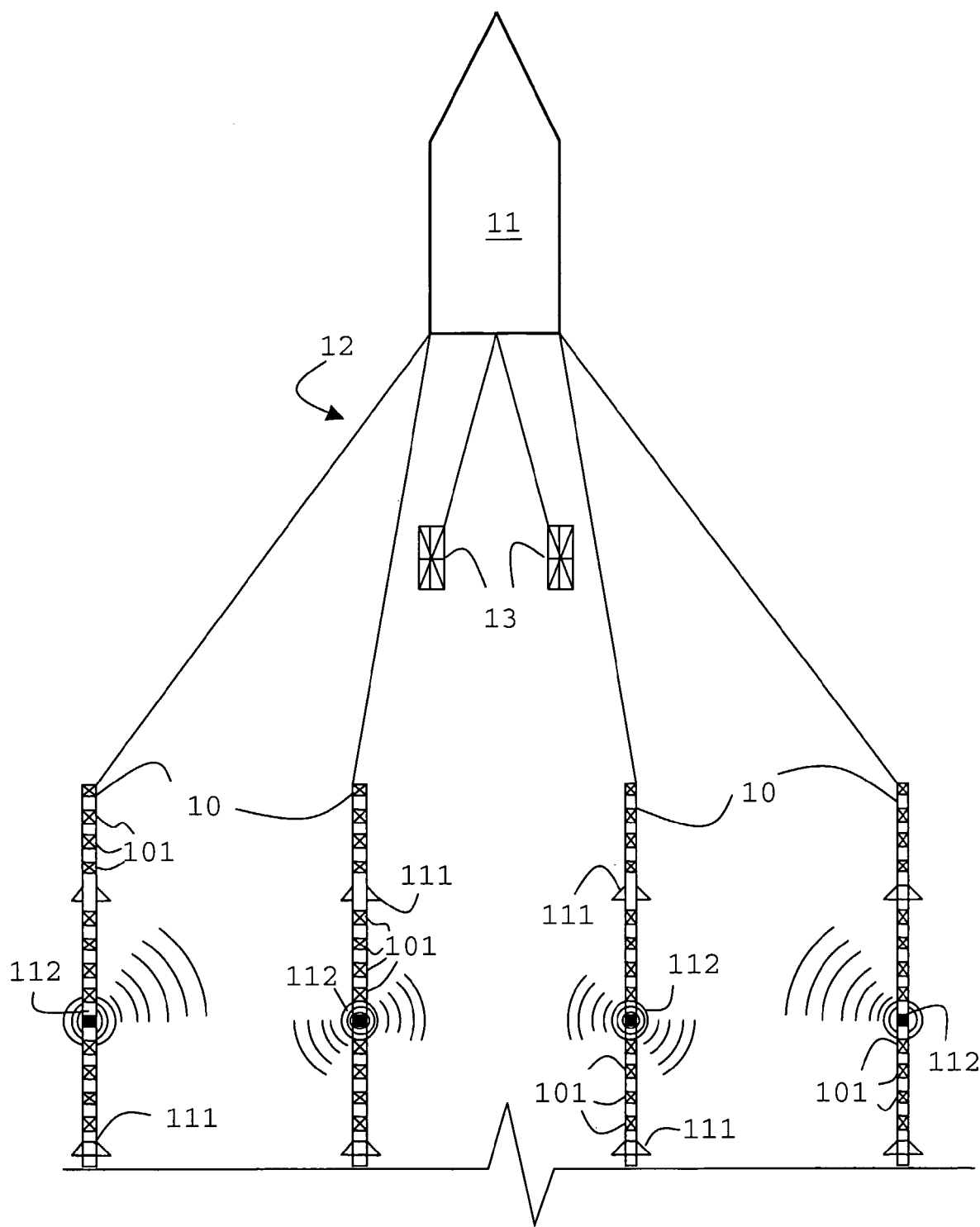

A typical marine seismic acquisition is illustrated in FIGS. 1A and 1B, which show a schematic top and side view on a marine seismic survey. Four instrumented cables or streamers 10 are towed by a ship 11. A front network 12 and similar tail network (not shown) is used to connect the vessel and the streamers. Embedded in the front network are seismic sources 13, typically an array of airguns. Each streamer 10 is typically assembled from many receiver holder segments that are coupled to make up the streamer. Between segments, the streamers carry controllable deflectors 111 (often referred to as vanes or "birds") and other aids for steering the streamer along a desired trajectory in a body of water.

The accurate positioning of modern streamers is controlled by a satellite based positioning system, such as GPS or differential GPS, with GPS receivers at the front and tail of the streamer. In addition to GPS based positioning, it is known to monitor the relative positions of streamers and sections of streamers through a network of sonic transceivers 112 that transmit and receive acoustic or sonar signals.

The main purpose of a streamer 10 is to carry a large number of seismic receivers 101 which are distributed along its length. In FIG. 1 the receivers are schematically depicted as marked boxes. Each receiver can be either two or more hydrophones arranged in a plane orthogonal to the streamer axis as described in the United Kingdom patent application no. GB 0402012.9 filed on Jan. 30, 2004. Alternatively, each receiver may be a dual sensor as described in U.S. Pat. No. 6,512,980.

During a survey, the sources 13 are fired at intervals and the receivers 101 "listen" within a frequency and time window for acoustic signals such as reflected and/or refracted signals that are caused by seismic features in path of the emitted wavefield. As a result of such a survey, a set of pressure data P(x,y,t) and, by making use of the multi-component capability of the streamer, a set of velocity related data V(x,y,t) are obtained at locations x,y and times t. The velocity is a vector with for example components in x, y and z.

The coordinates are Cartesian coordinates with x as in-line direction, which is a direction parallel to the main axis of the streamer, and y as cross-line direction perpendicular to the streamer axis and parallel to the (ideal) sea surface or plane in which the parallel streamers are towed. And the z-direction is taken to be vertical and orthogonal to x and y.

Applying the well-known Taylor's theorem, an analytic wavefield can be extrapolated away from a location where the wavefield and its derivatives are known:

$$P(x+\Delta x, y+\Delta y) = P(x, y) + [\Delta x \partial_x P(x, y) + \Delta y \partial_y P(x, y)] + \quad [1]$$

$$\frac{1}{2!}[(\Delta x)^2 \partial_{xx} P(x, y) + 2\Delta x \Delta y \partial_{xy} P(x, y) + (\Delta y)^2 \partial_{yy} P(x, y)] +$$

$$\frac{1}{3!}\begin{bmatrix} (\Delta x)^3 \partial_{xxx} P(x, y) + 3(\Delta x)^2 \Delta y \partial_{xxy} P(x, y) + \\ 3\Delta x (\Delta y)^2 \partial_{xyy} P(x, y) + (\Delta y)^3 \partial_{yyy} P(x, y) \end{bmatrix} + O(\Delta^4)$$

where $O(\Delta^n)$ indicates the order of terms neglected in the Taylor expansion (4 in equation [1]), and the operator $\partial_x$ denotes a spatial partial derivative—in this instance with respect to the x-direction. The Taylor series is infinite and is valid for extrapolation any distance away from the location where the wavefield and its derivatives are known. The range of the extrapolation is limited by truncating the Taylor series. Weights for extrapolation/interpolation can also be derived in other ways than through Taylor expansions. As an example in one embodiment of the current invention we derive numerically optimized weights to yield optimal results of interpolated/extrapolated over certain frequency bands and arrival angles (i.e., wavenumbers). In the following examples pressure data are extrapolated.

An application of the general equation of motion yields $$\partial_x P(x,y) = \rho \dot{V}_x(x,y), \quad [2]$$

and $$\partial_y P(x,y) = \rho \dot{V}_y(x,y), \quad [3]$$

where $\dot{V}_x$, $\dot{V}_y$ denote a time derivatives of $V_x$ and $V_y$, respectively, and $\rho$ is the density of water. Using equation [3] to replace the cross-line derivative of the pressure, all the terms required for the first-order accurate Taylor expansion of pressure away from the multi-component streamer are available:

$$P(x+\Delta x, y+\Delta y) = P(x,y) + [\Delta x \partial_x P(x,y) + \Delta y \rho \dot{V}_y(x,y)] + O(\Delta^2). \quad [4]$$

In equation [4] the option exists of expressing in-line derivatives with respect to pressure in terms of derivatives of in-line component of particle velocity through equation [2]. However, in the examples the in-line derivatives of pressure are used throughout. A variant of equation [4] can be applied to expansions into z-direction.

The second-order cross-line derivative of pressure from a multi-component streamer towed in the vicinity of the sea surface (e.g., at 6 m depth) can be expressed as:

$$\partial_{yy} P(x, y) = \frac{3}{1 + \frac{2}{15} k^2 h^2} \left[ \frac{k \cot(kh)}{h} P(x, y) - \frac{i\omega\rho}{h} V_z(x, y) \right] - \partial_{xx} P(x, y) + O(h) \quad [5]$$

Equation [5] is expressed in the space-frequency domain, h denotes the instantaneous depth of each recording element as a function of time and space and $k=\omega/c$ is the wavenumber where w is the angular frequency and c is the velocity in water. In order to be applicable for a time-variant rough sea, a space-time implementation using compact filters of equation [5] is necessary. This can be done successfully either by approximating the k dependent terms by truncated Taylor expansions (equivalent to time-derivatives in the time domain) or by overlapping triangular windows where the wave-height is considered constant within each window. Combining equations [1], [3] and [5] the Taylor expansion of pressure away from the multi-component streamer can be written as accurate up to the second order:

$$P(x + \Delta x, y + \Delta y) = P(x, y) + [\Delta x \partial_x P(x, y) + \Delta y \rho \dot{V}_y(x, y)] + \quad [6]$$
$$\frac{1}{2}[(\Delta x)^2 \partial_{xx} P(x, y) + 2\Delta x \Delta y \rho \partial_x \dot{V}_y(x, y)] +$$
$$\frac{(\Delta y)^2}{2}\left[\frac{3}{1 + \frac{2}{15}k^2 h^2}\left[\frac{k\cot(kh)}{h}P(x,y) - \frac{i\omega\rho}{h}V_z(x,y)\right] - \partial_{xx}P(x,y)\right] + O(\Delta^3)$$

Having derived expressions of the first- and second-order Taylor expansion in terms of measurable data, these expressions can be applied as filter to various problems of interest to seismic exploration and data analysis. A practical filter may approximate analytical expressions such as derivatives by their corresponding finite difference approximations.

As shown in FIG. 2, the applications for filters in accordance with the invention include generally the steps of obtaining the multi-component data using a multi-component streamer (Step 21), using an expansion equation with cross-line terms replaced as described above (Step 22) and using suitable computing devices to determine the inter- or extrapolated data (Step 23).

The first of such problems relates to the interpolation and intrapolation of pressure data in the direction along a streamer so as to derive values of the dataset at points between the location of receivers.

The problem of interpolating a wavefield between two points where the value of the wavefield and some of its derivatives are known is well-known in 1D and is solved by fitting Hermite polynomials to the data.

The multi-component streamer will have some redundancy in in-line measurements if both P and $V_x$ are recorded. This redundancy may be exploited to attenuate noise in a multi-component streamer. For the case where there are recordings of both P and $V_x$ and in order to suppress noise on P by means of filtering the maximum required sensor spacing can be relaxed, if a sufficiently dense grid of data values can be generated through interpolation. As the noise on the geophone components will be spatially aliased, this method may require a model for predicting the noise on the geophone components once it is known on the pressure components.

Hermite polynomials allow us to interpolate P data from neighboring P and $V_x$ recordings between $x=x_0$ and $x=x_1$ even though the slowest propagating noise mode may be spatially aliased on the P recordings themselves:

$$P(x, y_0) = P(x_0, y_0)(2s^3 - 3s^2 + 1) + P(x_1, y_0)(-2s^3 + 3s^2) + \quad [7]$$
$$\rho \dot{V}_x(x_0, y_0)(s^3 - 2s^2 + s) + \rho \dot{V}_x(x_1, y_0)(s^3 - s^2),$$

where the Hermite polynoms are written as function of $$s = \frac{(x - x_0)}{(x_1 - x_0)}.$$

A second application is the extrapolation away from a streamer.

To extrapolate pressure data away from a multi-component steamer, but not into the direction of another multi-components streamer, a 1D Hermite interpolation can be applied along the streamer to the point along the streamer that has the shortest distance to the point to which the data is to be extrapolated. The interpolation along the streamer can be performed to an arbitrary degree of accuracy by computing derivatives in the streamer direction of the different terms needed for the Taylor extrapolation (equation [4] or equation [6]) with spectral accuracy, provided that the required terms are not spatially aliased.

The Hermite interpolation, however, cannot be arbitrarily extended as by including ever higher-order derivatives more noise will be amplified.

The third problem relates to the interpolation and intrapolation of pressure data between two multi-component streamers.

A Hermite interpolation can likely not be used cross-line in between the streamers as the terms for a subsequent Taylor extrapolation probably are aliased. Instead, one needs to derive a modified form of the Taylor intrapolation formulae to constrain the extrapolated wavefield between the neighboring streamers for this special case.

If the wavefield and its derivatives are known at the corners of a triangle and one would like to interpolate the wavefield to a point in the interior of the triangle, a first possible method is to use a 2D Taylor expansion for each of the three points (equation [1]) and then linearly interpolate or weight the three values according to their barycentric weights. However it has been shown that this will result in an intrapolated wavefield with one degree of accuracy less than what can be achieved if the Taylor expansion coefficients are modified slightly such that the interpolants are forced to fit the data at all corners of the triangle and not only one at a time. An example of the modified Taylor expansion can be found for example in a recent thesis by D. Kraaijpoel, "Seismic ray fields and ray field maps: theory and algorithms. Utrecht University (2003).

Hence, to intrapolate the wavefield between two multi-component streamers the domain of receiver locations is triangulated such that each point in between the two streamers falls within a triangle with a receiver location at each corner. The wavefield is then extrapolated from each of the three recording locations to the interior point using the modified Taylor expansion. The data are then averaged using barycentric (triangular) weighting. The first- and second-order modified Taylor expansions of pressure $\tilde{P}$ are (see for example Kraaijpoel, 2003)

$$\tilde{P}(x + \Delta x, y + \Delta y) = P(x, y) + \frac{1}{2}[\Delta x \partial_x P(x, y) + \Delta y \rho \dot{V}_y(x, y)] + O(\Delta^2) \quad [8]$$

for the first-order expansion and as second-order expansion:

$$\tilde{P}(x + \Delta x, y + LP(x, y) + \frac{2}{3}[\Delta x \partial_x P(x, y) + \Delta y \rho \dot{V}_y(x, y)] + \quad [9]$$
$$\frac{1}{6}[(\Delta x)^2 \partial_{xx} P(x, y) + 2\Delta x \Delta y \rho \partial_x \dot{V}_y(x, y)] +$$
$$\frac{(\Delta y)^2}{6}\left[\frac{3}{1 + \frac{2}{15}k^2h^2}\left[\frac{k\cot(kh)}{h}P(x, y) - \frac{i\omega\rho}{h}V_z(x, y)\right] - \right.$$
$$\left. \partial_{xx} P(x, y)\right] + O(\Delta^3).$$

There are different coefficients in front of the terms in equations [8] and [9] compared to the traditional Taylor expansions [equations (4) and (6)]. The equations [8] and [9] are best used when interpolating data in 2D and not for extrapolation. The triangularisation can also be used when intrapolating between streamers on highly degenerated triangles. One side of such triangles is formed by the receiver spacing while the other two are determined by the much larger distance between streamers. Thus the above equations can be applied in the limit of $\Delta x \to 0$.

A fourth problem to which methods in accordance with the present invention can be applied is the intrapolation of pressure data at near source offsets.

This is a special case particularly important for applications in the field of multiple suppression. Generally, a survey obtains data from multiple adjacent streamers as shown in FIG. 1. But no data are available in the region closer to the source. However, at the source location symmetry conditions can be used in the interpolation such that the pressure data are symmetric across the location of the source. In other words, a Taylor expansion of the wavefield away from the source location will only contain even terms which are symmetric (pressure, second derivatives of pressure, etc.), but no odd terms which are anti-symmetric. The argument is correct for the direct wave and for the case of a one-dimensional (1D) model of the Earth but breaks down with variations in the sub-surface. However, the symmetry is likely to be a strong additional constraint for extrapolation to near offsets. If the near-field source signature is known (e.g., by using the CMS(TM) technology of Western-Geco), then such information may be added to constrain the interpolation of the direct arrival.

Finally, another special case is that of a multi-component streamer towed parallel to a conventional streamer recording P data only (P and all in-line spatial derivatives are known). Also for this case a modified form of the Taylor intrapolation formulae as above to constrain the extrapolation is likely to benefit from the fact that the pressure wavefield and its in-line derivatives are known along the conventional streamer.

To numerically test the performance of the above-described methods, a noise free ray-based 3D synthetics was generated using a 50 Hz monochromatic source. The source was placed at the origin at 6 m depth below the sea surface. Recordings were made at 6 m below the sea surface. A primary reflection was simulated from a reflector with a reflection coefficient of 1. The medium between source, receivers and the reflector was taken to be homogeneous with a velocity of 1500 m/s. The sea surface was modeled as a flat reflector with a reflection coefficient of −1. The receiver-side ghost were included in the synthetics.

Figure 3A:
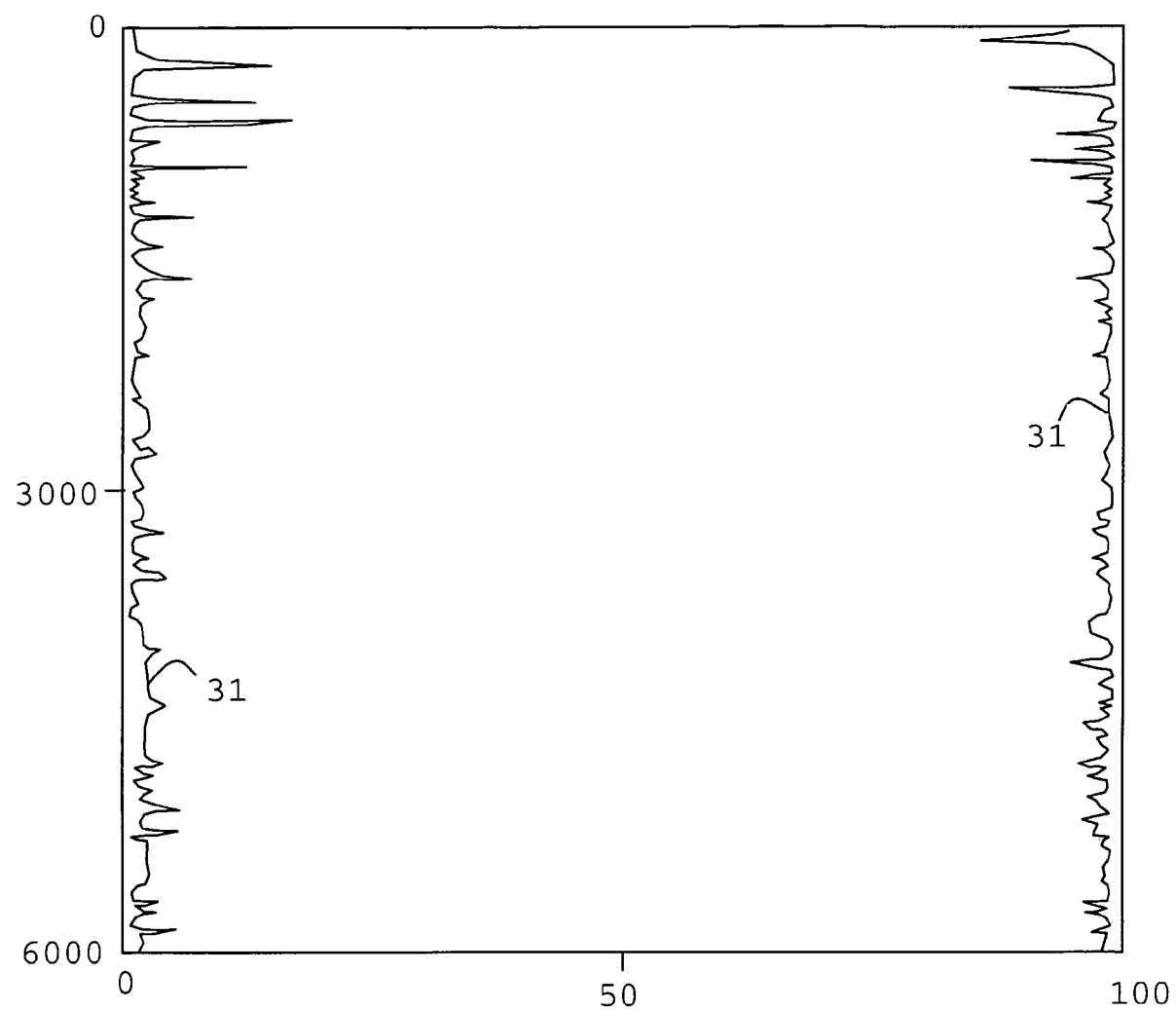
FIGS. 3A-3C compare the performance of interpolations with increasing order in accordance with examples of the invention at one dB value (−26)
Figure 3B:
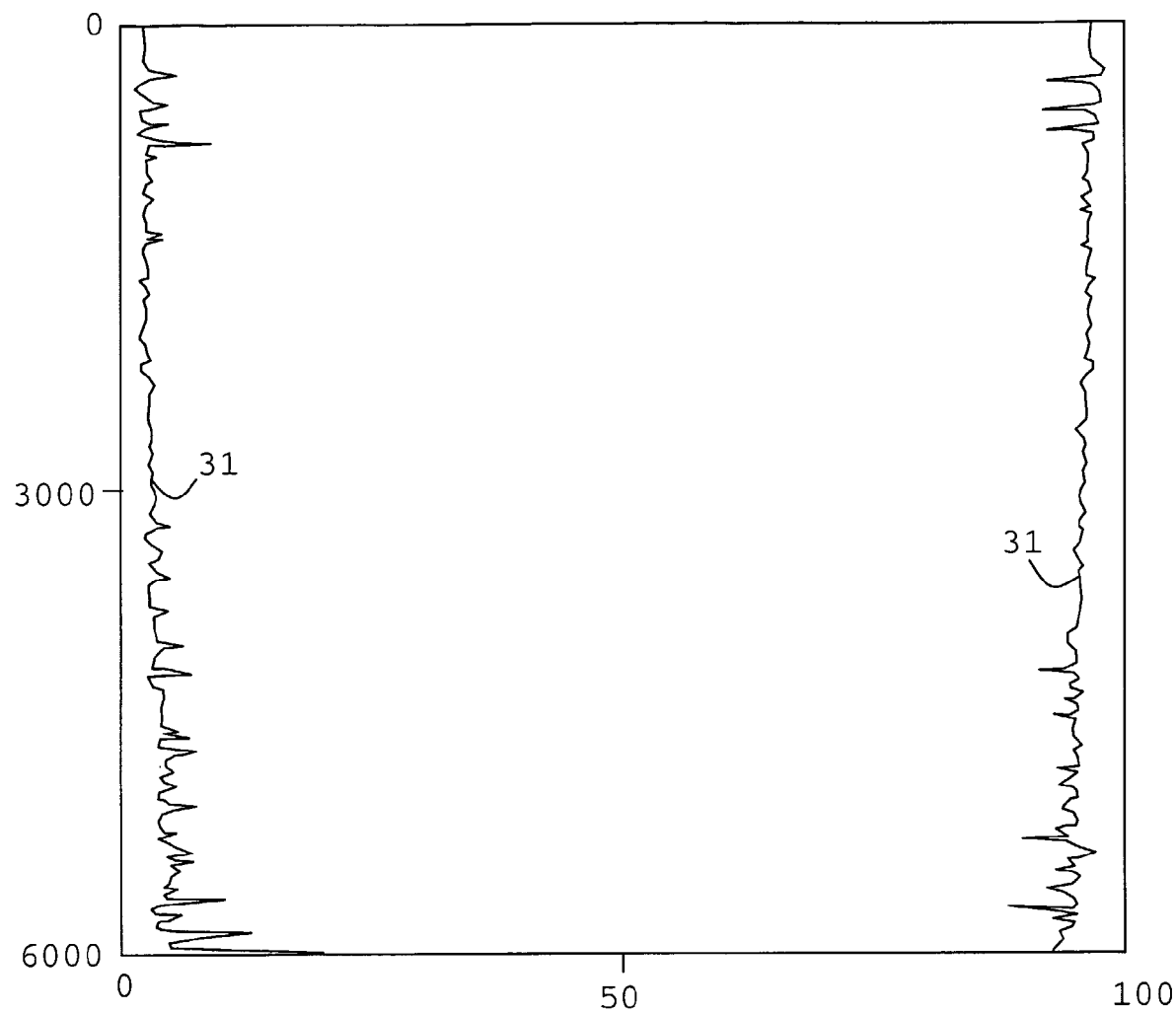
Figure 3C:
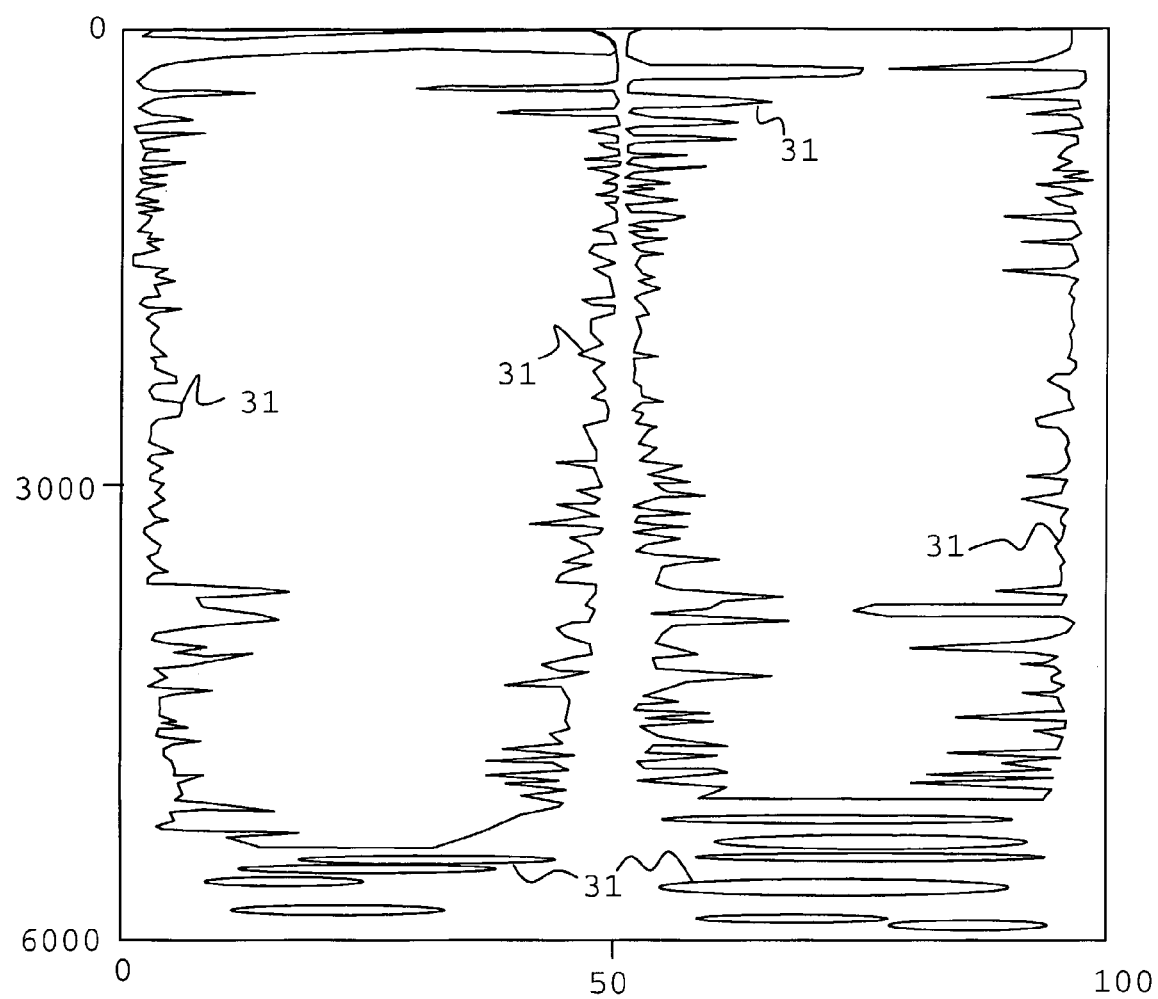

The plots of FIGS. 3A to 3C illustrate the error between the correct response and the intrapolated response in case of the reflector being located at a depth of 2500 m below the source and a cross-line dip of 10 degrees. The dip results in a wave arriving at 20 degrees angle at the receivers.

The −26 db contour is shown as lines 31. The ordinate shows the inline distance from the source location, while the abscissa is the cross-line offset or distance with a streamer located at the left border and second streamer located at the right border of the plot. The distance between the two streamers is set to be 100 m.

The plot of FIG. 3A is the intrapolation using pressure data only, hence the data available from two conventional streamers. In FIG. 3B, a first-order intrapolation using equation [8] is shown and in FIG. 3 the second-order intrapolation of equation [9] is used. With increasing order of interpolation, accurate data can be calculated in increasing distance from the location of the receivers. In FIG. 3C the −26 dB contour line 31, is split into several regions.

Figure 4A:
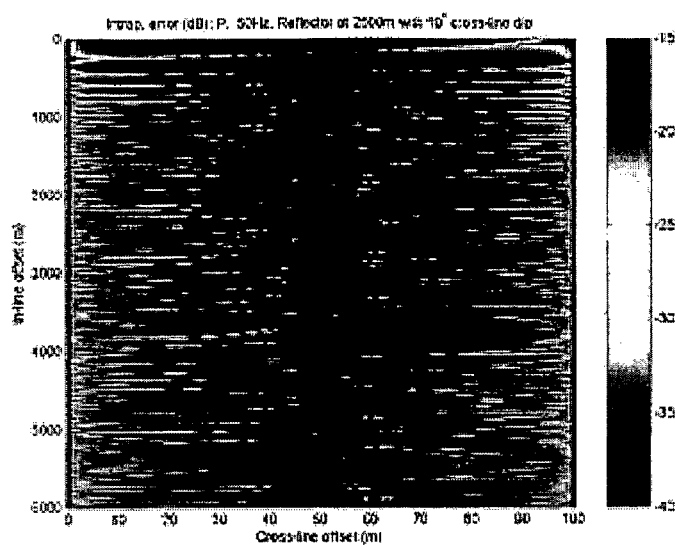
FIGS. 4A-4C compare the performance of interpolations with increasing order in accordance with examples of the invention at a range of dB values.
Figure 4B:
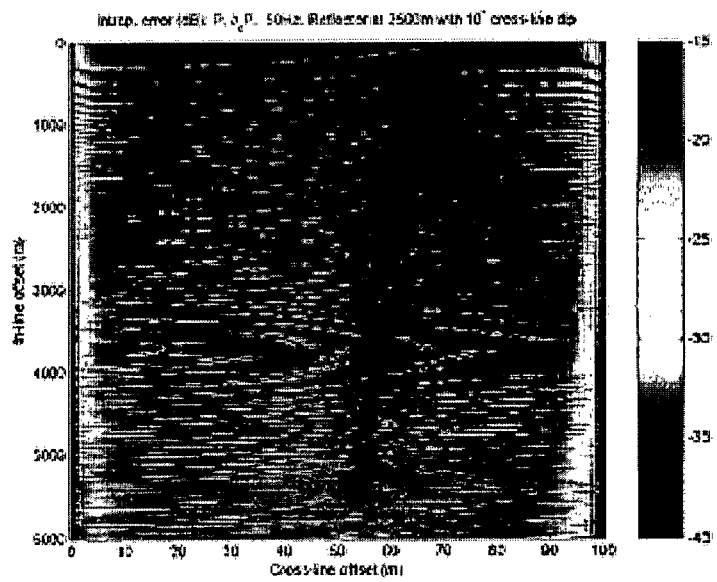
Figure 4C:
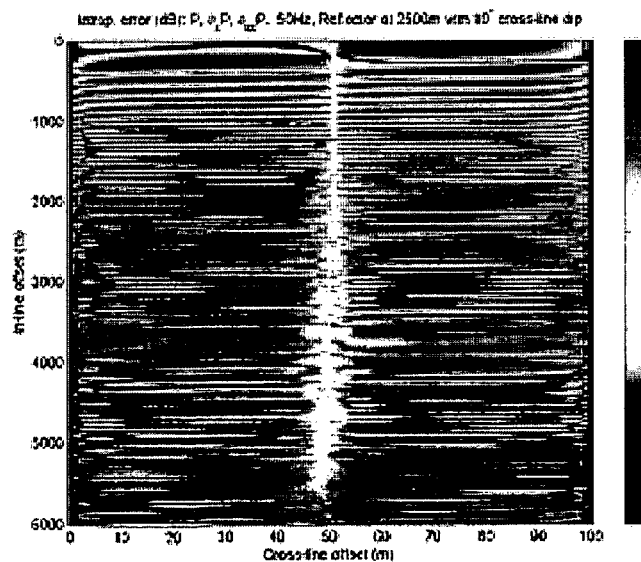

Full colored plots of the FIGS. 3A-3C are added as FIGS. 4A to 4C.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of interpolating and/or extrapolating seismic recordings, comprising:
    obtaining multi-component seismic data including pressure data and particle motion data from at least one streamer carrying a plurality of multi-component receivers adapted to measure multiple pressure values and derive pressure gradient values therefrom or adapted to directly measure particle velocities and/or time derivatives of particle velocities directly;
    using said pressure gradient values or particle velocities or time derivatives of particle velocities in an interpolating and/or extrapolating filter; and
    applying the filter to the pressure data and/or the particle motion data to yield new pressure data and/or new particle motion data associated with a location that has not been measured by the plurality of receivers in the seismic recordings.

2. The method of claim 1 wherein the interpolating and/or extrapolating filter is based on an expansion series.

3. The method of claim 2 wherein the expansion series is a Taylor series.

4. The method of claim 3 wherein the expansion series is a Taylor series with modified weighting.

5. The method of claim 4 wherein the expansion series is a Taylor series with barycentric or triangular weighting.

6. The method of claim 2 wherein in the expansion series is accurate to a first order.

7. The method of claim 2 wherein in the expansion series is accurate to a second order.

8. The method of claim 1 wherein cross-line derivatives of pressure data in the interpolating and/or extrapolating filter are replaced by functions of in-line derivatives of pressure data and/or particle motion data.

9. The method of claim 1 further comprising extrapolating into a direction away from a streamer.

10. The method of claim 1 further comprising intrapolating into a space between two streamers.

11. The method of claim 1 further comprising intrapolating into a space between two streamers, wherein one streamer is not a multi-component streamer.

12. The method of claim 1 further comprising intrapolating into a direction along a streamer.

13. The method of claim 1 further comprising intrapolating towards a seismic source.

14. The method of claim 1 wherein the interpolating and/or extrapolating filter for pressure data includes pressure gradient terms and using said pressure gradient values or particle velocities or time derivatives of particle velocities for said pressure gradient terms.

15. The method of claim 1 wherein the interpolating and/or extrapolating filter for pressure data includes cross-line pressure gradient terms and using said pressure gradient values or particle velocities or time derivatives of particle velocities for said cross-line pressure gradient terms.

16. The method of claim 1, wherein the particle motion data comprises velocity data.

17. The method of claim 1, wherein the particle motion data comprises acceleration data.

18. A method of interpolating and/or extrapolating seismic recordings, comprising:
    obtaining multi-component seismic data including pressure data and particle motion data from at least one streamer carrying a plurality of multi-component receivers adapted to measure multiple pressure values and derive pressure gradient values therefrom or adapted to directly measure particle velocities and/or time derivatives of particle velocities directly; and
    using said pressure gradient values or particle velocities or time derivatives of particle velocities in an interpolating and/or extrapolating filter for pressure data, wherein the interpolating and/or extrapolating filter is based on a Taylor series with barycentric or triangular weighting.

19. A method of interpolating and/or extrapolating seismic recordings, comprising:
    obtaining multi-component seismic data including pressure data and particle motion data from at least one streamer carrying a plurality of multi-component receivers adapted to measure multiple pressure values and derive pressure gradient values therefrom or adapted to directly measure particle velocities and/or time derivatives of particle velocities directly; and
    using said pressure gradient values or particle velocities or time derivatives of particle velocities in an interpolating and/or extrapolating filter for pressure data, wherein cross-line derivatives of pressure data in the interpolating and/or extrapolating filter are replaced by functions of in-line derivatives of pressure data and/or particle motion data.

* * * * *